(12) United States Patent
McGhan et al.

(10) Patent No.: US 6,842,587 B1
(45) Date of Patent: Jan. 11, 2005

(54) USE OF AMPLIFIED SPONTANEOUS EMISSION FROM A SEMICONDUCTOR OPTICAL AMPLIFIER TO MINIMIZE CHANNEL INTERFERENCE DURING INITIALIZATION OF AN EXTERNALLY MODULATED DWDM TRANSMITTER

(75) Inventors: Douglas D. McGhan, Ottawa (CA); Alen Chan, Scarborough (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/538,224

(22) Filed: Mar. 30, 2000

(51) Int. Cl.[7] .............................................. H04B 10/04
(52) U.S. Cl. ....................... 398/201; 398/197; 398/198; 398/183
(58) Field of Search ................................ 398/201, 196, 398/192, 197, 194, 195, 183, 198

(56) References Cited

U.S. PATENT DOCUMENTS 5,675,432 A * 10/1997 Kosaka .................. 359/337.13
6,023,362 A * 2/2000 Walker et al. ............... 398/184

* cited by examiner

Primary Examiner—M. R. Sedighian
Assistant Examiner—Christina Y. Leung (57) ABSTRACT

A semiconductor optical amplifier (SOA) is placed in the optical path between the tunable laser and the external modulator on a DWDM optical transmitter. The modulator transfer function is measured using low-level amplified spontaneous emission light output from the SOA in order to find the modulator bias corresponding to minimum transmission. The external modulator is biased to the point of minimum transmission to reduce the transmitter output power during laser turn-on. The SOA bias is also turned off to provide further attenuation as the laser is turned on. Similarly, to avoid emitting off-wavelength light during wavelength changes, the transmitter output is attenuated with a combination of low SOA bias current and biasing the modulator to its minimum transmission point. In both cases, the laser wavelength is allowed to stabilize without interfering with adjacent DWDM channels.

22 Claims, 7 Drawing Sheets

USE OF AMPLIFIED SPONTANEOUS EMISSION FROM A SEMICONDUCTOR OPTICAL AMPLIFIER TO MINIMIZE CHANNEL INTERFERENCE DURING INITIALIZATION OF AN EXTERNALLY MODULATED DWDM TRANSMITTER

FIELD OF THE INVENTION

This invention relates to optical transmitters and, more particularly, to an improved method of controlling the transmitter optical output power during card initialization and wavelength tuning.

BACKGROUND OF THE INVENTION

A typical lightwave communications system consists of an optical transmitter, which is usually a semiconductor laser diode (emitting in the invisible infrared region of the optical spectrum) with associated electronics for modulating it with the information bearing signals; a transmission channel—namely the optical fiber which carries the modulated light beam; and finally, a receiver, which consists of an optical detector and associated electronics for retrieving the signal.

The optical transmitter in any lightwave communications system performs the functions of generating an optical wave and impressing information on the wave by modulation. A laser light source is commonly used in high speed optical fibre communication systems. Chromatic dispersion of the optical fibre transmission medium requires that the optical spectrum emitted by the laser light source be narrow to avoid distortion of the propagating optical waveform. Modulating the output intensity of a semiconductor laser diode using excitation current typically results in spectral broadening (chirping) of the transmitted optical signal. This chirping limits the tolerance of the optical signal to fibre dispersion and, therefore, limits the transmission distance and/or bit-rate of the system.

Chirp and turn-on transient effects associated with direct modulation of a semiconductor laser diode can be avoided completely if the light generation and modulation processes are separated. The laser can be allowed to operate continuous wave (CW), and an external modulator is interposed between the laser and the node output. Chirping of the external modulator can be controlled to optimize the optical signal for the specific system design.

Figure 1:
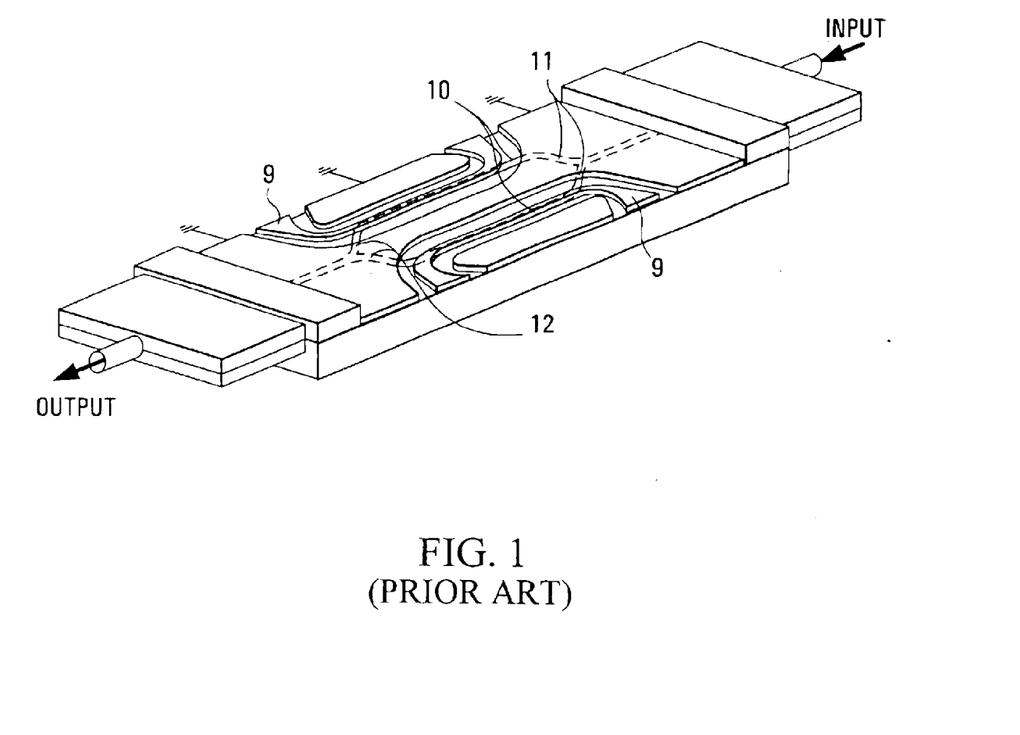
FIG. 1 depicts the configuration of a typical Mach-Zehnder interferometer modulator.

A common way of implementing intensity or amplitude modulation is to use waveguides as the arms of a Mach-Zehnder interferometer with electrodes deposited alongside or on top of the arms as shown in FIG. 1. The waveguides 10 are connected at both the input and output ends by Y-branches 11, 12. Input light waves to the input Y-branch 11 divide the power equally among the two waveguides 10. They recombine at the output Y-branch 12. With no voltage applied to the electrodes, the input and output light-waves are in phase to present an intense output. By applying enough voltage to change the phase difference between the branches to $\pi$ radians, the output light intensity becomes zero. Any voltage in between will change the intensity accordingly, thus achieving intensity modulation. More generally, the transmission function of the interferometer is proportional to the square cosine function of the differential phase shift in the two arms.

The most useful external modulators are based on a voltage-dependent phase retardation in some material, either semiconductor, insulating crystal, or organic polymer. With crystals or anisotropic polymers, the electro-optic effects is used, i.e. the voltage dependence of refractive index. That is, many crystals will respond to an applied electric field in certain crystal orientations to produce changes in the refractive index of the crystal. The modulator structure is usually implemented as a waveguide lithographed in or on a substrate material.

To date, most external modulators have been implemented as separate devices in lithium niobate ($LiNbO_3$), which has a very high electro-optic coefficient along certain axes. Lithium niobate has a large temperature coefficient of expansion which can result in an effective imbalance in optical path length between the two arms of a Mach-Zehnder interferometer. Specifically, the bias characteristics of a $LiNbO_3$ Mach-Zehnder interferometer change with temperature and aging of the device. Optical transmitters using this technology for external modulation are required to search for and control to the appropriate bias level. This search results in optical power transients during transmitter card initialization.

A single wavelength laser diode may be operated at a low bias current to reduce the optical output power during the search for external modulator bias conditions. However, this technique has two limitations.

Firstly, the output wavelength of the laser diode is typically dependent on the laser bias current. In a dense wavelength division multiplexed (DWDM) system it is critical that the transmitter emit light only at the wavelength of the desired channel. It is, therefore, necessary to compensate for the change in wavelength due to bias current with a change in laser operating temperature (temperature tuning of the laser wavelength). This technique cannot be applied if the CW light source is a tunable laser diode which uses the laser operating temperature as a wavelength tuning mechanism. Secondly, it may not be possible to reduce the laser output power sufficiently to eliminate the effects of optical power transients on the system.

The single wavelength laser diodes used in most transmitter realizations to date are usually of sufficient power such that the use of optical amplifiers to boost the optical signal is not warranted. The wavelength and output power of such transmitters are not readily controllable as mentioned above. However, the need for precise control of transmitter output wavelength and optical power is critical in current DWDM systems where channels are packed closer and closer together to meet the ever-increasing demands for more and more capacity.

SUMMARY OF THE INVENTION

A semiconductor optical amplifier (SOA) is placed in the optical path between a continuous wave (CW) laser and an external modulator in a dense wavelength division multiplexed (DWDM) optical transmitter. Amplified spontaneous emission (ASE) from the SOA output is used to characterize the external modulator and to determine bias levels corresponding to minimum transmission. The broad ASE spectrum has a low power spectral density and, thus, introduces less crosstalk to adjacent DWDM channels than a laser light source of equivalent output power.

The external modulator is biased to the point of minimum transmission (as determined above) so that the transmitter output power may be reduced during laser turn-on and laser wavelength tuning. The SOA is turned off to provide attenuation as the laser is turned on or during laser wavelength tuning. This allows the laser wavelength to stabilize without interfering with adjacent DWDM channels. The SOA gain can also be used to control the optical output power of the transmitter. In addition, a small signal modulation may also be applied to the SOA bias for the purposes of channel identification.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

FIG. 4b illustrates the photocurrent vs. wavelength response for the multi-wavelength etalon reference detailed in FIG. 4a.

DESCRIPTION OF THE PREFERRED EMBODIMENTS

Figure 2:
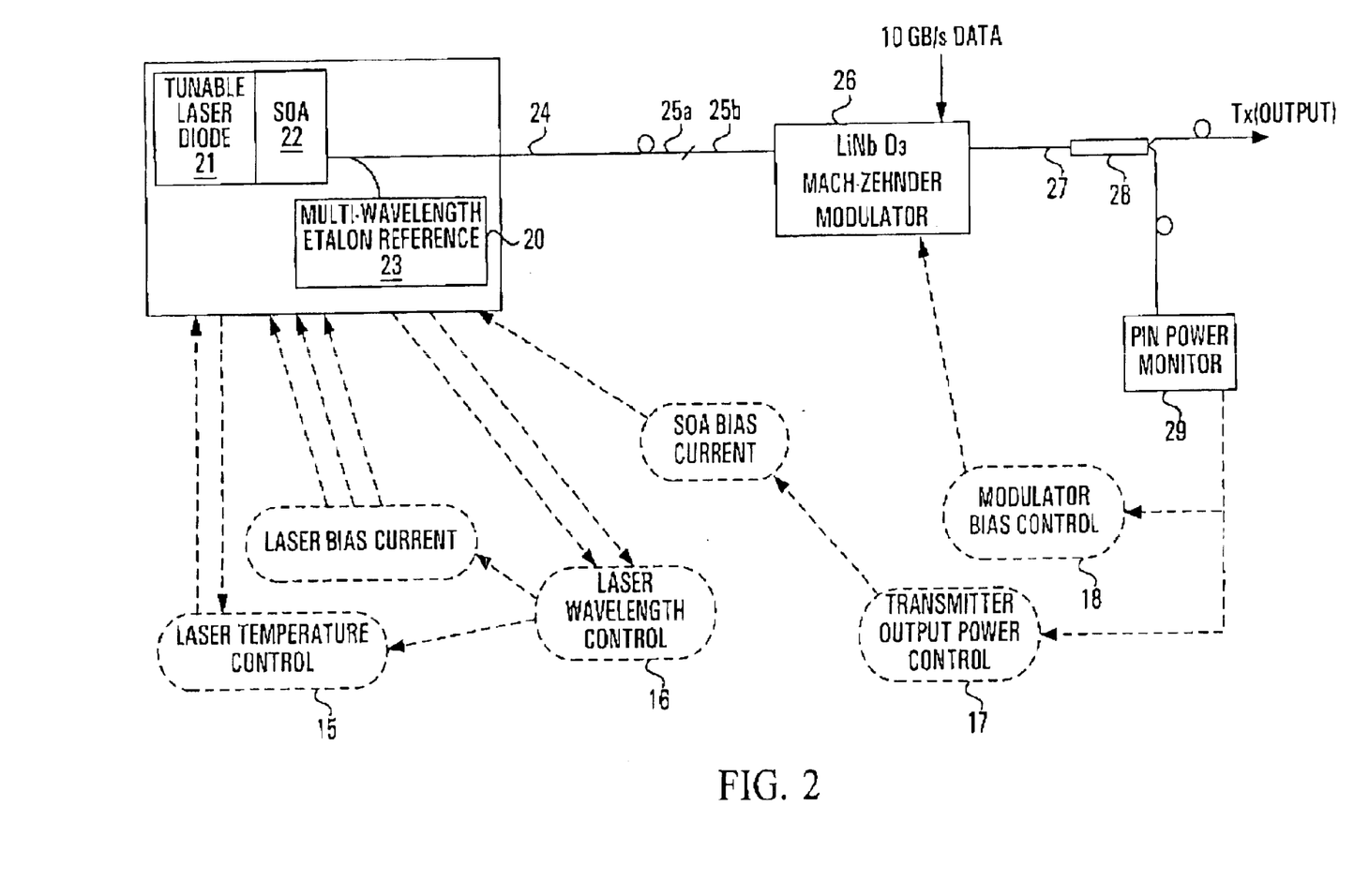
FIG. 2 depicts the conventional arrangement of a tunable CW laser transmitter.

FIG. 2 depicts the arrangement of a tunable laser transmitter suitable for use with the invention. A tunable laser module 20 comprises a tunable laser diode 21 and a semiconductor optical amplifier (SOA) 22. The laser module 20 also includes a multi-wavelength etalon reference 23. The laser module 20 is coupled into a polarization maintaining (PM) single mode fiber 24. An output end 25a of the PM single mode fiber is spliced into an input fiber 25b of an external modulator 26 with the same polarization orientation. At the output 27 of the modulator 26, a tap coupler 28 is used to tap off a portion (~5%) of the transmitter output power to a single PIN power monitor (photodetector) 29 to monitor the output power. This photocurrent signal is used to close the mean power control loop. The remaining power then forms the transmitter output Tx.

The tunable laser diode 21 is a continuous wave (CW) laser source. For example, the laser diode 21 may comprise a three-section distributed feedback (DFB) tunable laser which is mounted on a high power thermoelectric cooler whose current is used to control the laser temperature to the desired target. Wavelength tuning is achieved by a combination of bias current and substrate temperature adjustment. Numerous other tunable laser technologies are emerging in the field so the specific technology or tuning mechanism used with the invention is not limited to the example cited above.

Various control mechanisms are also depicted in FIG. 2. For example, a laser temperature control 15 uses feedback from a laser thermistor (not shown) to control the thermoelectric cooler current and achieve the laser temperature setpoint. A laser wavelength control 16 uses feedback from the multi-wavelength etalon reference 23 to control the laser bias current and temperature setpoint. A transmitter output power control 17 uses feedback from the transmitter power monitor photodiode 29 to control the SOA bias current and achieve the desired transmitter output power. And finally, a modulator bias control 18 is used to optimize the transmitted optical waveform and to track bias drift of the modulator.

The semiconductor optical amplifier (SOA) 22 is used to boost the power of the CW light from the tunable laser diode 21. The SOA output power is required to be adjustable to achieve the desired transmitter output power range. Also, it is preferred that the SOA 22 be integrated on the same substrate as the tunable laser diode 21 to reduce overall transmitter cost and to reduce the size of the optical components. The SOA bias current determines the SOA gain and can, therefore, be used to control the transmitter output power. In addition, the broad ASE light output from the SOA is used during transmitter start-up to find the initial bias point of the external modulator 26.

Figure 3:
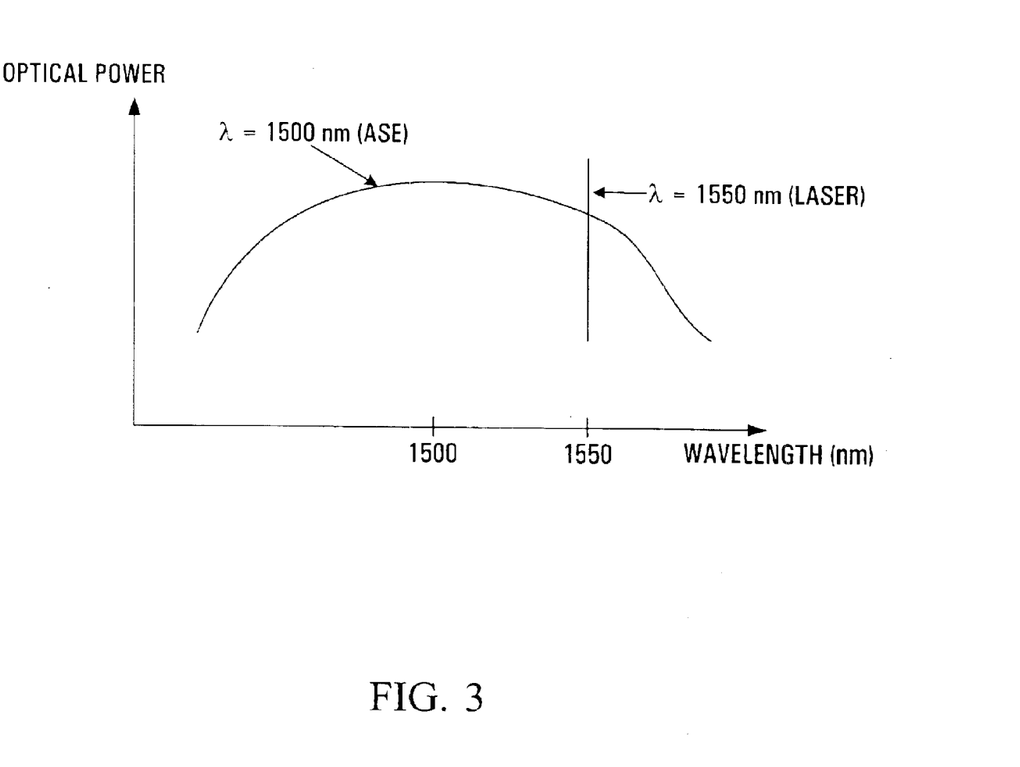
FIG. 3 depicts the typical ASE spectrum for a semiconductor optical amplifier (SOA).

Like any other amplifier, semiconductor optical amplifiers (SOAS) generate and amplify noise that appears at the output along with the signal. Random spontaneous-emission events occur within the amplifier and appear at the output as amplified spontaneous emission (ASE). The SOA ASE spectrum is determined primarily by the bandgap of the semiconductor material employed. FIG. 3 shows a typical ASE spectrum and the associated lasing wavelength to be amplified. Typically, the peak of the ASE spectrum is chosen to be at a shorter wavelength than the wavelength to be amplified. This is done to improve efficiency and increase the saturated output power. The full width half maximum (FWHM)of the ASE spectrum is typically 50–100 nm.

Figure 4A:
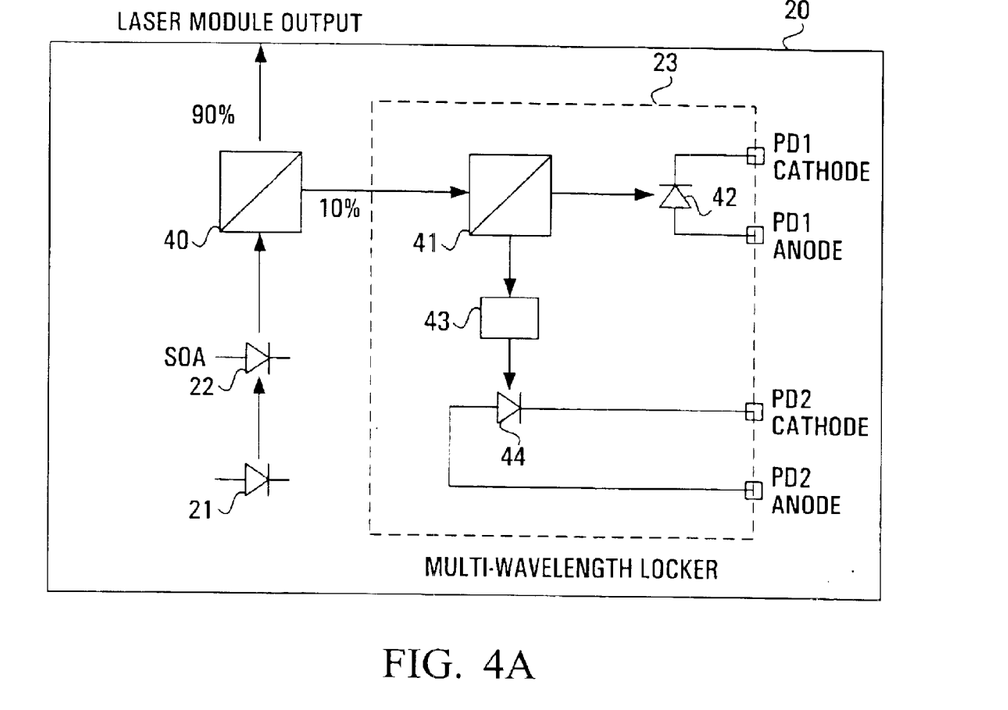
FIG. 4a is an illustration of a tunable laser module detailing the arrangement of the multi-wavelength etalon reference.
Figure 4B:
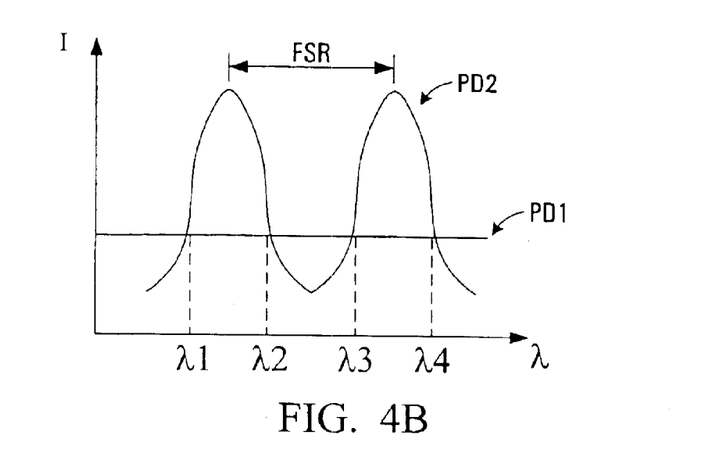

As shown in FIG. 2, the multi-wavelength etalon reference 23 is used to provide feedback to the laser wavelength control process 16. FIG. 4a depicts the tunable laser module 20 of FIG. 2, detailing the arrangement of the multi-wavelength etalon reference 23. An optical beam splitter 40 is used to tap off approximately 10% of the light from the laser/SOA output. As can be seen, the light is split again via a beam splitter 41 into two paths within the multi-wavelength reference section 23. One path goes directly to a photodetector (PD1) 42 to measure the average power. The second beam is passed through a high finesse etalon filter element 43 with a free-spectral range (FSR) of approximately 100 GHz and then to a second photodetector (PD2) 44. FIG. 4b shows the photocurrent vs. wavelength response for the multi-wavelength etalon reference 23 of FIG. 4a. As seen, the multi-wavelength etalon reference 23 is designed such that equal photodetector currents PD1, PD2 correspond to reference optical wavelengths ($\lambda 1 \ldots \lambda 4$) on the ITU 50 GHz grid.

The external modulator 26 in FIG. 2 is a lithium niobate ($LiNbO_3$) Mach-Zehnder (M-Z) interferometer modulator and is used to apply the 10 Gb/s data to an optical carrier signal. Other potential modulators include, but are not limited to, the Michelson interferometer and the electro-absorptive modulator. However, the Mach-Zehnder interferometer is the most commonly used modulator for external modulation of a tunable CW laser source.

Figure 5A:
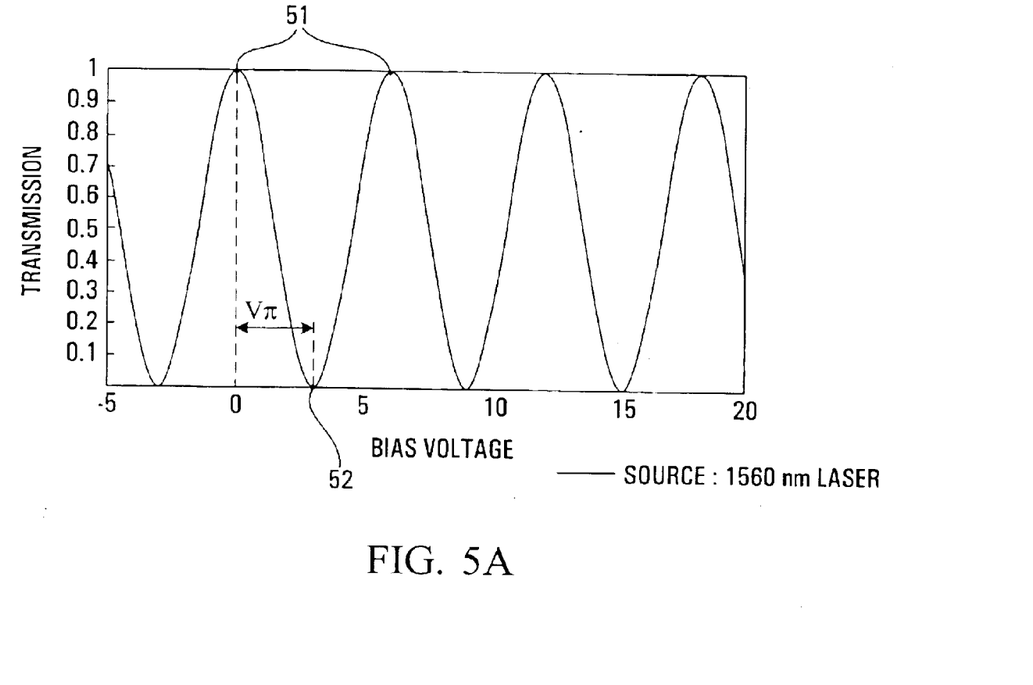
FIG. 5a illustrates the bias voltage vs. transmission characteristic for a typical Mach-Zehnder interferometer.

The modulator bias setting is used to attenuate the optical output during the transmitter start-up sequence and laser wavelength tuning. As shown in FIG. 5a, the bias voltage vs. transmission characteristic (i.e. the transfer function) of the Mach-Zehnder interferometer is a raised cosine function 50. As indicated, $V\pi$ is the dc bias voltage required to change from the maximum transmission bias point 51 to the minimum transmission bias point 52.

Figure 5B:
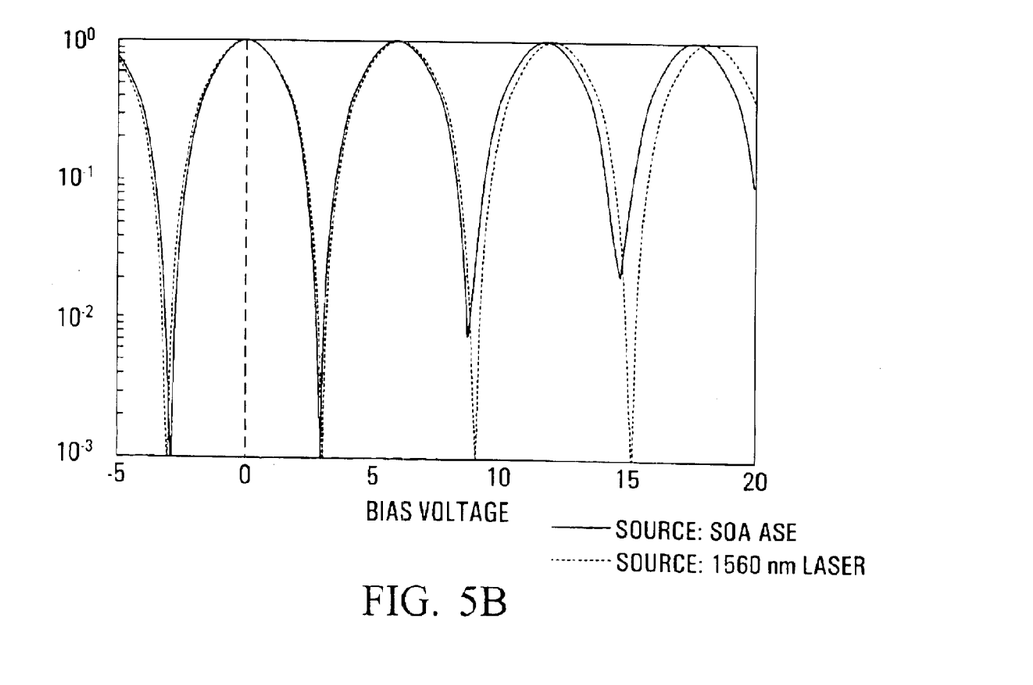
FIG. 5b is a log scale illustration demonstrating the wavelength dependence of the bias voltage vs. transmission characteristic for a typical Mach-Zehnder interferometer.

Ideally, the $LiNbO_3$ Mach-Zehnder modulator is designed to have equal optical path lengths in its two arms when unbiased. The dc bias voltage applied creates a difference in optical length between the two arms. The minimum transmission point is found when the optical length of one arm is $\lambda/2$ longer or shorter than the other. This condition corresponds to destructive interference. Optical path length differences of more than $\lambda$ result in wavelength dependence on the bias voltage required for minimum and maximum transmission as shown in FIG. 5b.

As alluded to earlier, the wavelength of a tunable continuous wave (CW) laser changes as a function of bias current and temperature. As the bias current is applied to the CW laser to turn it on, the laser wavelength changes and may interfere with adjacent DWDM channels. Therefore, the external modulator is biased to the minimum transmission point and the SOA is biased off during this time to attenuate the optical signal and allow the laser wavelength to stabilize or be controlled to some wavelength reference.

It is well known, however, that $LiNbO_3$ modulator bias characteristics tend to drift with temperature and time. For this reason, the inventive method involves scanning the modulator transfer function each time during transmitter start-up to determine the dc bias voltages corresponding to minimum and maximum transmission. The modulator transfer function is measured using low level ASE light output from the SOA in order to find the modulator bias voltages corresponding to maximum attenuation (minimum transmission) or maximum transmission (minimum attenuation). The dc bias is continually controlled during transmitter operation to stay on the desired part of the modulator transfer function. The use of low level ASE light during the search for the operating bias of the external modulator greatly reduces the potential for interference with existing DWDM channels.

The SOA is also used to control the optical output power of the transmitter with no impact on the lasing wavelength. The transmitter power can, thus, be increased slowly so that downstream optical amplifiers are not disrupted as the transmitter is added to a system carrying traffic on other DWDM channels. A small signal modulation may also be applied to the SOA bias current. This results in a modulated optical power output and can be used for channel identification purposes in the DWDM system. Advantageously, the SOA has very low chirp relative to directly modulating the CW laser diode.

Figure 6:
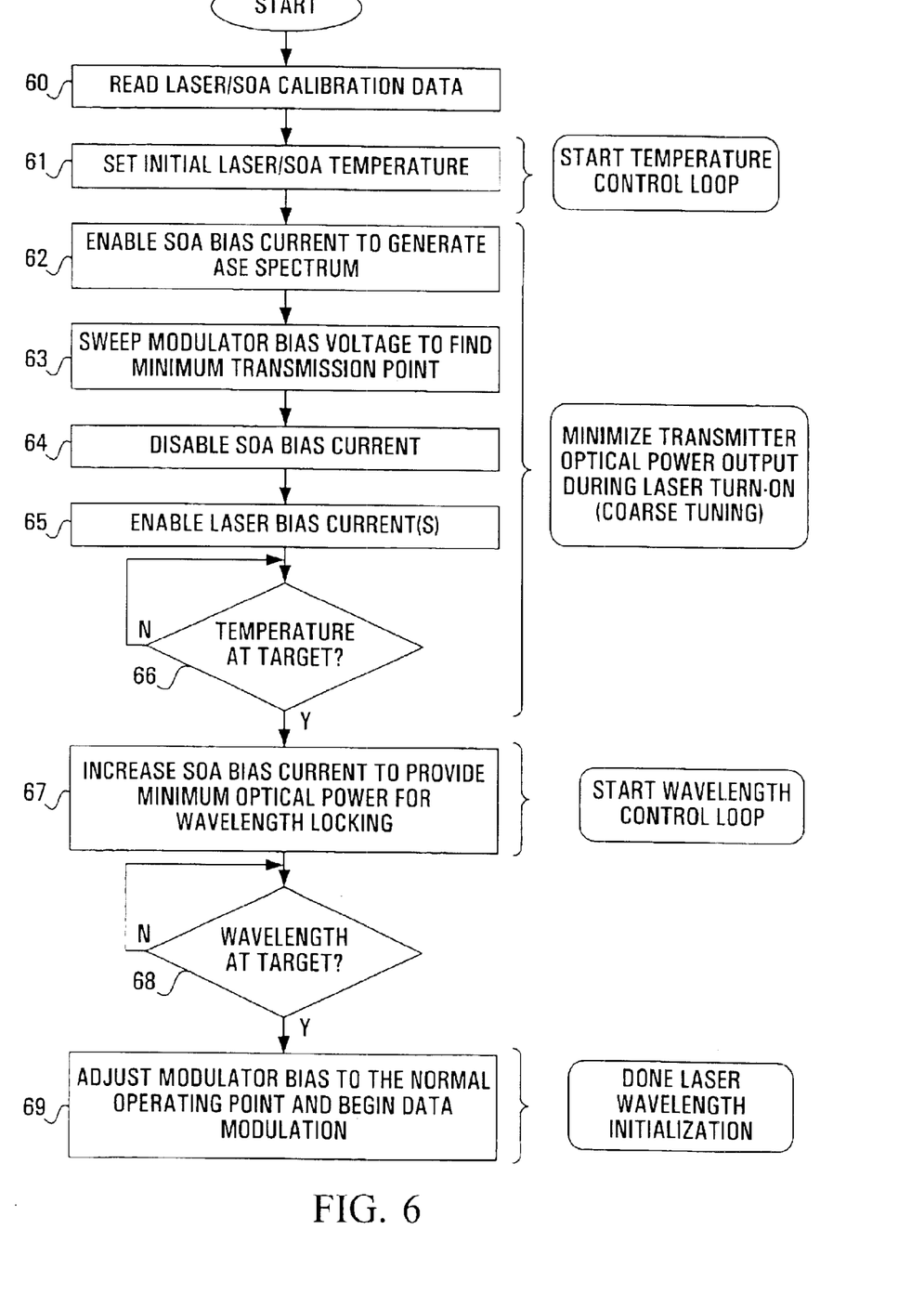
FIG. 6 is a flowchart of the start-up control sequence according to the invention carried out by the transmitter upon power-up.

FIG. 6 is a flowchart of the transmitter start-up control sequence upon power-up according to the invention. The control sequence consists of steps 61 through 69 which may be implemented by any suitable computer readable program code stored on a computer readable storage medium e.g. flash memory.

To begin the control sequence, laser/SOA calibration data is first read as indicated in step 60. Laser and SOA calibration data is stored on the transmitter card in flash memory. Calibration data consists of the laser temperature and bias current settings, the SOA bias current setting, and the target value of the ratio between the two wavelength monitor photocurrents. This operating data (for the default transmission wavelength) is to be read each time the transmitter is turned on.

Next, in step 61, the initial laser/SOA temperature is set. As indicated, this starts the temperature control loop. The laser/SOA substrate temperature is controlled to the target value from the calibration data.

Then, in step 62, the SOA bias current is turned on without input from the tunable laser source. This generates a broad optical spectrum of amplified spontaneous emission (ASE).

As indicated in step 63, the modulator bias voltage is then swept over the range of $+/-V\pi$ in order to find the dc bias voltage corresponding to minimum transmission of the Mach-Zehnder interferometer. The optical output of the modulator is monitored by the transmitter power monitor photodiode (29 in FIG. 2) during the bias sweep.

After the minimum transmission point is found, the SOA bias current is turned off as represented by step 64. In this disabled state, the SOA acts to absorb the optical power output as the tunable laser diode is turned on. After the laser bias current is enabled in step 65, the firmware waits until the laser substrate temperature has stabilized. This is represented by decision step 66. Once the laser bias and substrate temperature have reached their target values from the calibration file, the wavelength control loop may be initiated. The SOA bias current is gradually increased until the optical power out of the laser/SOA is sufficient to lock the laser wavelength to the wavelength reference. This is represented in step 67.

In step 68, a check is made to confirm whether or not the wavelength has reached its target value. If so, the modulator bias is adjusted to its normal operating point so that data modulation may begin as indicated in step 69. The Mach-Zehnder modulator is normally biased −3 dB from the transmission maximum and modulated about that point by the data. Upon completion of the laser wavelength initialization, the transmitter is how ready to transmit traffic and the transmitter output power can be adjusted to the desired setting by changing the SOA bias current.

The need for precise control of transmitter output wavelength and optical power during transmitter card initialization is most critical in a dense wavelength division multiplexed (DWDM) system. However, these requirements can be extended to a wavelength division multiplexed (WDM) system, particularly if a widely tunable CW laser is used. Therefore, the invention may be applied to any externally modulated laser source in a WDM system where the external modulator response must be measured to find the minimum transmission point. In the embodiment described above, the Mach-Zehnder bias is used to attenuate the light output of the CW laser as it is turned on and brought to the desired operating wavelength and output power.

Figure 7:
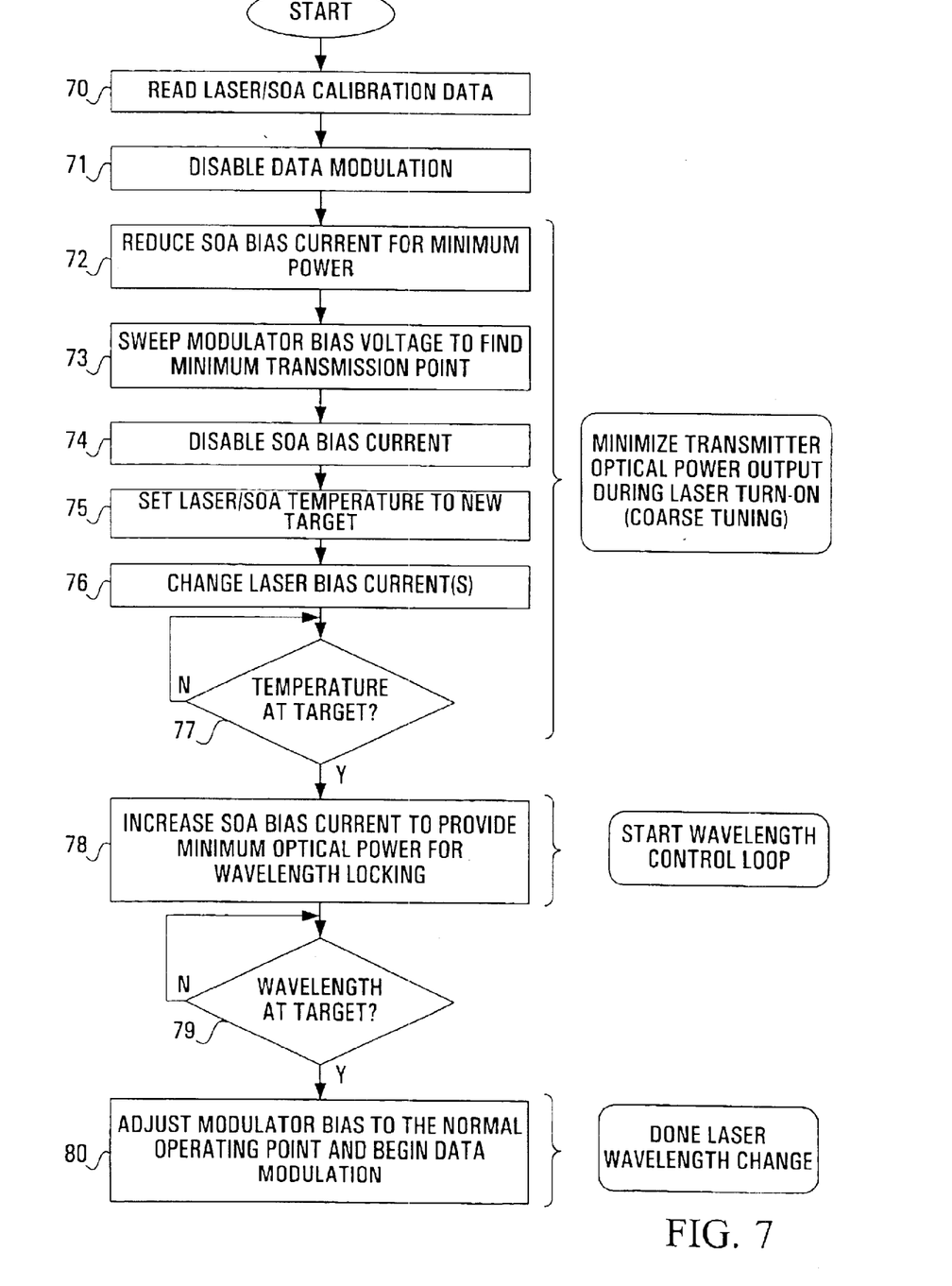
FIG. 7 is a flowchart of the laser wavelength change sequence according to the invention carried out by the transmitter during wavelength tuning.

FIG. 7 is a flowchart depicting the control sequence followed during laser wavelength tuning according to the invention. For the most part, this sequence is identical to that of FIG. 6 with only a few minor changes. Again, the control sequence begins by reading the laser/SOA calibration data (step 70). In this case, the operating data (for the requested transmission wavelength) is to be read each time the transmitter wavelength is changed. Next, in step 71, the high speed data modulation process is disabled. Then, as indicated in step 72, the SOA bias is reduced to the minimum required power to maintain the wavelength lock.

Next, in step 73, the modulator bias voltage is then swept over the range of $+/-V\pi$ in order to find the dc bias voltage corresponding to minimum transmission of the Mach-Zehnder interferometer. The optical output of the modulator is monitored by the transmitter power monitor photodiode during the bias sweep.

After the minimum transmission point is found, the SOA bias current is turned off as represented by step 74. In the disabled state, the SOA acts to absorb the optical power output of the tunable laser diode as the wavelength is changed.

Subsequently, the laser/SOA temperature is changed to the target for the requested wavelength in step 75. Similarly, in step 76, the laser bias current is also changed to the target value for the requested wavelength. As indicated in step 77, the controller firmware then waits until the substrate temperature has stabilized at the new target value.

Once the laser bias and substrate temperature have stabilized, the SOA bias current is gradually increased until the optical power out of the laser/SOA is sufficient to lock the laser wavelength to the wavelength reference. This process, represented by step 78, initiates the wavelength control loop to keep the laser wavelength at the target.

In step 79, a check is made to confirm whether or not the wavelength is at its target value. If so, the modulator bias is adjusted to its normal operating point so that data modulation may begin as indicated in step 80. This completes the laser wavelength change process. The transmitter is now ready to transmit traffic and the transmitter output power can be adjusted to the desired setting by changing the SOA bias current.

It should be noted that the invention may also be applied to single-wavelength CW laser transmitters which are currently employed in most systems. For example, although the laser is not tunable in these cases, the inventive method may still be employed during transmitter start-up to attenuate the transmitter output power and thereby allow the laser wavelength to stabilize without interfering with adjacent DWDM channels.

Finally, with respect to the tunable laser embodiment described above, an alternate method for performing laser wavelength tuning is to simply turn the transmitter output off and to then reinitialize the transmitter with a different target wavelength (as demonstrated in FIG. 6). This, of course, eliminates the need for the modified control sequence described by FIG. 7.

Advantageously, both the control sequences depicted in FIGS. 6 and 7 minimize the transmitter optical power output during both laser turn-on and wavelength tuning. The transmitter arrangement of FIG. 2 is, therefore, exemplary of the preferred embodiment of the invention when controlled in the manner described above with reference to FIGS. 6 and 7. Preferably, laser wavelength selection and control is performed by electrical to optical (E/O) controller firmware. Typically, this firmware is stored in flash memory on the transmitter card and is accessed by a microprocessor that is dedicated to controlling the E/O components of the respective circuit pack. However, it may also be possible to combine this functionality with that of any other microprocessor. Therefore, the microprocessor and firmware may be located either on the circuit pack or remotely.

As an example, the user may select the desired laser wavelength from those available via software. If the requested wavelength is available, the firmware will make appropriate changes to laser temperature and bias conditions and lock the emitted wavelength to a stable reference on the 50 GHz ITU grid. To avoid emitting off-wavelength light during wavelength changes, the transmitter output will be attenuated with a combination of low SOA bias current and biasing the Mach-Zehnder modulator to its minimum transmission point.

While preferred embodiments of the invention have been described and illustrated, it will be apparent to one skilled in the art that numerous modifications, variations and adaptations may be made without departing from the scope of the invention as defined in the claims appended hereto.

What is claimed is:

1. In an externally modulated wavelength division multiplexed (WDM) optical transmitter comprising a continuous wave (CW) laser, a semiconductor optical amplifier (SOA) positioned after the laser and an external modulator positioned after the SOA, a method of controlling start-up of the transmitter comprising the steps:

maintaining the laser in a disabled (off) mode;

operating the SOA so as to generate a broad spectrum of amplified spontaneous emission (ASE) light output;

biasing the modulator substantially to a modulator minimum transmission state;

turning off the SOA; and turning on the laser.

2. A method according to claim 1 wherein the step of biasing the modulator substantially to a modulator minimum transmission state comprises:

sweeping the modulator over a range of bias voltages and monitoring the modulator output power to determine the bias voltage vs. transmission characteristic of the modulator; and biasing the modulator to a minimum transmission state as determined by the preceding step.

3. A method according to claim 2 wherein monitoring of the modulator output power is carried out by a transmitter power monitor photodiode positioned after the external modulator.

4. A method according to claim 1 wherein the SOA is integrated onto the same substrate as the CW laser.

5. A method according to claim 1 wherein the external modulator is a Mach-Zehnder interferometer modulator.

6. A method according to claim 5 wherein the Mach-Zehnder interferometer modulator is formed from lithium niobate (LiNbO$_3$) crystal.

7. A method according to claim 1 wherein the continuous wave (CW) laser is a tunable laser.

8. In an externally modulated wavelength division multiplexed (WDM) optical transmitter comprising a continuous wave (CW) laser, a semiconductor optical amplifier (SOA) positioned after the laser and an external modulator positioned after the SOA, a method of tuning the transmitter to a desired wavelength comprising the steps:

disabling data modulation;

turning down the SOA to a minimum power so as to still maintain a wavelength lock;

biasing the modulator substantially to a modulator minimum transmission state;

turning off the SOA;

setting the laser temperature and SOA temperature to values corresponding to the desired wavelength; and adjusting the laser bias current to a value corresponding to the desired wavelength.

9. A method according to claim 8 wherein the step of biasing the modulator substantially to a modulator minimum transmission state comprises:

sweeping the modulator over a range of bias voltages and monitoring the modulator output power to determine the bias voltage vs. transmission characteristic of the modulator; and biasing the modulator to a minimum transmission state as determined by the preceding step.

10. A method according to claim 9 wherein monitoring of the modulator output power is cared out by a transmitter power monitor photodiode positioned after the external modulator.

11. A method according to claim 8 wherein the SOA is integrated onto the same substrate as the CW laser.

12. A method according to claim 8 wherein the external modulator is a Mach-Zehnder interferometer modulator.

13. A method according to claim 8 wherein the Mach-Zehnder interferometer modulator is formed from lithium niobate (LiNbO$_3$) crystal.

14. A method according to claim 8 wherein the continuous wave (CW) laser is a tunable laser.

15. A computer readable storage medium having computer readable program code means embodied therein for controlling the start-up of an externally modulated WDM optical transmitter, said optical transmitter comprising a CW laser, a semiconductor optical amplifier (SOA) positioned after the CW laser, an external modulator positioned after the SOA, the computer rile program code means comprising:

computer readable program code means for applying bias to the SOA while maintaining the laser in a disabled (off) mode so as to generate a broad spectrum of amplified spontaneous emission (ASE) light output;

computer readable program cod means for biasing the modulator substantially to a modulator minimum transmission state;

computer readable program code means for turning off the SOA bias; and computer readable program code means for turning on the laser.

16. A computer readable storage medium according to claim 15 further comprising:

computer readable program code means for sweeping the modulator over a range of bias voltages;

computer readable program code means for monitoring the modulator output power to determine the bias voltage vs. transmission characteristic of the modulator; and computer readable program code means for biasing the modulator to a minimum transmission state as determined by the preceding step.

17. A computer readable storage medium having computer readable program code means embodied therein for tuning an externally modulated WDM optical transmitter to a desired wavelength, said optical transmitter comprising a CW laser, a semiconductor optical amplifier (SOA) positioned after the CW laser, an external modulator positioned after the SOA, the computer readable program code means comprising:

computer readable program code means for disabling data modulation;

computer readable program code means for turning down the SOA to a minimum power so as to still maintain a wavelength lock; computer readable program code means for biasing the modulator substantially to a modulator minimum transmission state;

computer readable program code means for turning off the SOA;

computer readable program code means for setting the laser temperature and SOA temperature to values corresponding to the desired wavelength; and computer readable program code means for setting the laser bias current to a value corresponding to the desired wavelength.

18. In an externally modulated wavelength division multiplexed (WDM) optical transmitter comprising a continuous wave (CW) laser, a semiconductor optical amplifier (SOA) positioned after the laser and an external modulator positioned after the SOA, a method of turning the transmitter to a desired wavelength comprising the steps:

turning the laser off;

setting the laser temperature and SOA temperature to values corresponding to the desired wavelength;

operating the SOA so as to generate a broad spectrum of amplified spontaneous emission (ASE) light output;

biasing the modulator substantially to a modulator minimum transmission state;

turning off the SOA; and turning on the laser.

19. An externally modulated wavelength division multiplexed (WDM) optical transmitter comprising a continuous wave (CW) laser, a semiconductor optical amplifier (SOA) positioned after the laser and an external modulator positioned after the SOA, said transmitter being operable wider computer readable program code means for controlling start-up of the transmitter, the computer readable program code means comprising:

computer readable program code means for applying bias to the SOA while maintaining the laser in a disabled (off) mode so as to generate a broad spectrum of amplified spontaneous emission (ASE) light output;

computer readable program code means for biasing the modulator substantially to a modulator minimum transmission state;

computer readable program code means for turning off the SOA bias; and computer readable program code means for turning on the laser.

20. An externally modulated wavelength division multiplexed (WDM) optical transmitter comprising a continuous wave (CW) laser, a semiconductor optical amplifier (SOA) positioned after the laser and an external modulator positioned after the SOA, the SOA gain being adjustable so as to provide control of the optical output power of the transmitter, wherein amplified spontaneous emission (ASE) from the SOA is used to characterize bias levels of the external modulator.

21. An externally modulated wavelength division multiplexed (WDM) optical transmitter comprising a continuous wave (CW) laser, a semiconductor optical amplifier (SOA) positioned after the laser and an external modulator positioned after the SOA, the SOA gain being adjustable so as to provide control of the optical output power of the transmitter, wherein a bias setting of the external modulator is capable of being varied so that the external modulator can operate in a manner which includes, at least, a normal transmission state, which is used during normal signal transmission, and a minimum transmission state, which aids in optical power attenuation of a laser transmission wavelength to reduce wavelength channel interference during periods of laser instability.

22. An externally modulated wavelength division multiplexed (WDM) optical transmitter comprising a continuous wave (CW) laser, a semiconductor optical amplifier (SOA) positioned after the laser and an external modulator positioned after the SOA, the SOA gain being adjustable so as to provide control of the optical output power of the transmitter, wherein a bias setting of the external modulator is capable of being varied so that the external modulator can operate in a manner which includes, at least, a normal transmission state, which is used during normal signal transmission, and a minimum transmission state, which aids in optical power attenuation of a laser transmission wavelength to reduce wavelength channel interference during periods of laser instability, wherein the minimum transmission state is characterized with the use of a broad amplified spontaneous emission (ASE) spectrum provided by the SOA.

* * * * *

UNITED STATES PATENT AND TRADEMARK OFFICE
CERTIFICATE OF CORRECTION

PATENT NO. : 6,842,587 B1
DATED : January 11, 2005
INVENTOR(S) : Douglas D. McGhan et al.

It is certified that error appears in the above-identified patent and that said Letters Patent is hereby corrected as shown below:

Column 8,
Line 65, "...cared..." should be -- ...carried... --.

Column 9,
Line 16, "...rile..." should be -- ...readable... --.
Line 22, "...cod..." should be -- ...code ... --.

Column 10,
Line 18, "...wider..." should be -- ...under... --.

Signed and Sealed this

Seventeenth Day of May, 2005

JON W. DUDAS
*Director of the United States Patent and Trademark Office*